May 19, 1925. Re. 16,078

J. M. OLIN

BATTERY CUP

Original Filed April 17, 1922

Inventor:
JOHN M. OLIN.
By John H. Bruninga
Atty.

Reissued May 19, 1925. Re. 16,078

UNITED STATES PATENT OFFICE.

JOHN M. OLIN, OF EAST ALTON, ILLINOIS, ASSIGNOR, BY MESNE ASSIGNMENTS, TO WESTERN CARTRIDGE COMPANY, OF EAST ALTON, ILLINOIS, A CORPORATION OF DELAWARE.

BATTERY CUP.

Original No. 1,438,779, dated December 12, 1922, Serial No. 554,313, filed April 17, 1922. Application for reissue filed September 6, 1923. Serial No. 661,293.

*To all whom it may concern:*

Be it known that I, JOHN M. OLIN, a citizen of the United States, and residing at East Alton, county of Madison, Illinois, have invented the new and useful Improvement in Battery Cups, of which the following is a specification.

This invention relates to cartridges, especially for small arms, and this invention relates more particularly to battery cups therefor.

A cartridge is provided with a battery cup, which is closed at one end by a primer cap, which latter is provided with the priming composition, while the other end of the battery cup has a flash hole. In the primer cavity thus formed is arranged an anvil cooperating with the priming composition to effect ignition of the propelling charge in the cartridge. The primer cavity is, however, partly empty; accordingly where powders of fine grain are used for the propelling charge, as is the case of cartridges for small arms there is a tendency of the individual grains of powder to sift into the flash hole leading from the primer cavity of the battery cup; accordingly when the explosion takes place, the primer cap is liable to be blown from the battery cup or ruptured, or gas is liable to leak around the periphery of the cap or through the side walls of the cap or battery cup; obviously this is not only objectionable but it is liable to cause damage.

One of the objects of this invention, therefore, is to provide a battery cup, in which such sifting is prevented.

Further objects will appear from the detail description taken in connection with the accompanying drawing, in which.

Figure 1:
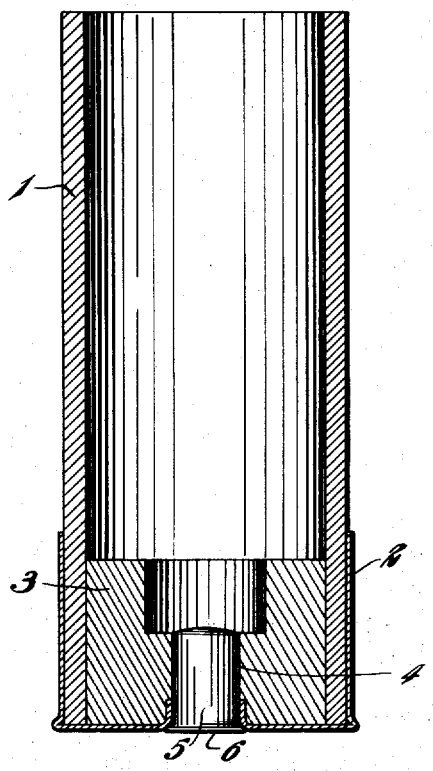
Figure 1 is a section of a cartridge shell showing the battery cup embodying this invention.

Referring to the accompanying drawing, and more particularly to Figure 1, the cartridge is shown as a shot-gun shell comprising a paper tube 1, a base 2 and a base wad 3 provided with a recess 4 for receiving the battery cup.

Figure 2:
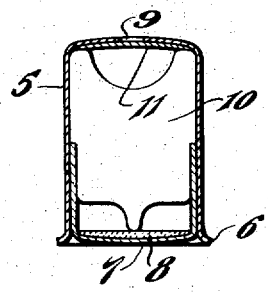
Figure 2 is an enlarged section of the battery cup.

Referring to Figure 2, the battery cup comprises a casing 5 open at one end and provided with a flange 6: in this open end is forced the usual primer cap 7 provided with the usual priming composition 8. The other end of the battery cup is closed, except that it is perforated as shown at 9 to provide a flash hole. An anvil 10 is provided between the cap and the closed end of the casing. This battery cup so far described may be of any suitable or usual construction.

It will be seen that when the primer cavity formed in the casing is entirely open, then powder grains from the propelling charge in the shell can sift into the cavity through the flash hole and, therefore, cause excessive explosion in the primer cavity with the results previously described. In accordance with this invention, therefore, the flash hole is closed by a disc 11 which may be conveniently located between the anvil and the end of the battery cup casing. This disc 11 is in the form of a membrane so that while it effectively prevents sifting of the propelling powder grains into the primer cavity, it nevertheless is ruptured by the force of the explosion within the cavity caused by the detonation of the primer composition, so that the force of the explosion will blow out this membrane covering the flash hole; in this way, the ignition of the charge within the cartridge is effected and at the same time, entrance of propelling powder grains into the primer cavity is obviated.

The membrane may be of any suitable material which will be readily ruptured when the primer is fired; preferably this membrane is of a material which is itself inflammable. A suitable material for this purpose is collodion, which is a solution of gun cotton in a suitable solvent, and a thin film or membrane of which can be placed over the flash hole, either outside or inside of the battery cup. Since this membrane is inflammable, not only will it blow out by the force of the explosion but it will itself burn up with ignition of the priming composition; accordingly it will, therefore, not retard the combustion of the primer gases at all.

It will, therefore, be seen that the invention accomplishes its objects. The provision of the membrane closing the flash hole in the battery cup effectively prevents sifting of the propelling powder into the primer cavity but does not retard or in any way effect the desired firing of the propelling charge within the shell.

Figure 3:
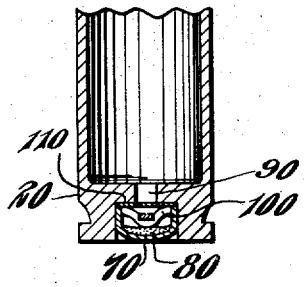
Figure 3 is a longitudinal section of a metallic cartridge, showing another embodiment of this invention.

Figure 3 shows the application of this invention to a metallic cartridge. In such a cartridge the primer cap 70 and anvil 100 are assembled with the primer composition 80 in a unit, and this unit is placed in the primer pocket in the head 20 of the metallic cartridge. The flash hole 90 is in this case formed in the head of the cartridge and communicates with the primer cavity in the cap, as the anvil is cross-shaped to effect such communication.

In accordance with this invention the membrane 110 is placed in the primer pocket and between the flash hole and the cap. The function of the membrane is the same as in the embodiment shown in Figures 1 and 2 and further description is, therefore, unnecessary.

It will, therefore, be seen that in accordance with this invention, the cartridge, and more particularly the battery cup, has a partly empty primer cavity whose flash end is obstructed against entrance of the propelling powder charge, but this flash end is rupturable so as to permit the propelling charge to be ignited.

It is obvious that various changes may be made in details without departing from the spirit of this invention; it is, therefore, to be understood that this invention is not to be limited to the specific details shown and described.

Having thus described the invention, what is claimed is:

1. A cartridge having a partly empty primer cavity provided with a flash hole, and a membrane closing said flash hole.

2. A cartridge having a partly empty primer cavity provided with a flash hole, and an inflammable membrane closing said flash hole.

3. A battery cup having a flash hole leading from a partly empty primer cavity, and a membrane over said flash hole.

4. A battery cup having a flash hole leading from a partly empty primer cavity, and an inflammable membrane over said flash hole.

5. A battery cup having a primer cap and provided with a flash hole leading from a partly empty primer cavity, and a membrane over said flash hole.

6. A battery cup having a cavity closed at one end by a cap and having a flash hole at its other end leading from a partly empty primer cavity, and a membrane over said flash hole.

7. A battery cup having a cavity closed at one end by a cap and having a flash hole at its other end leading from a partly empty primer cavity, an anvil in said cavity, and a membrane between said anvil and said flash hole.

8. In a cartridge for small arms and having a fine grain propelling charge, a battery cup having a partly empty primer cavity whose flash end is obstructed against entrance of the propelling charge.

9. In a cartridge for small arms and having a fine grain propelling charge, a battery cup having a partly empty primer cavity provided with a rupturable flash end.

10. In a cartridge for small arms and having a fine grain propelling charge, a battery cup having an anvil within a partly empty primer cavity and having an obstructed flash end.

11. In a cartridge for small arms and having a fine grain propelling charge, a battery cup having an anvil within a partly empty primer cavity and having a rupturable flash end.

12. In a cartridge for small arms and having a fine grain propelling charge, a battery cup having a partly empty primer cavity whose flash end is closed by a combustible.

Signed at East Alton, Illinois, this 29th day of June, 1923.

JOHN M. OLIN.